Figure 1:
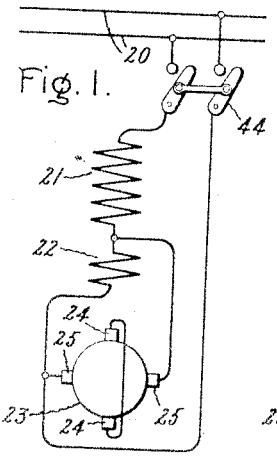

W. C. KORTHALS-ALTES.
ALTERNATING CURRENT MOTOR.
APPLICATION FILED DEC. 28, 1915.

1,257,884.

Patented Feb. 26, 1918.
2 SHEETS—SHEET 1.

Inventor:
Willem C. Korthals-Altes,
by Albert G. Davis
His Attorney.

Inventor:
Willem C. Korthals-Altes,
by
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

ALTERNATING-CURRENT MOTOR.

1,257,884.  Specification of Letters Patent.  Patented Feb. 26, 1918.

Application filed December 28, 1915. Serial No. 69,001.

*To all whom it may concern:*

Be it known that I, WILLEM C. KORTHALS-ALTES, a subject of the Queen of the Netherlands, residing at Schenectady, county of Schenectady, State of New York, have invented certain new and useful Improvements in Alternating-Current Motors, of which the following is a specification.

My invention relates to alternating current motors and particularly to alternating current commutator motors, and the object of the invention is to provide a novel and improved alternating current commutator motor.

Figure 2:
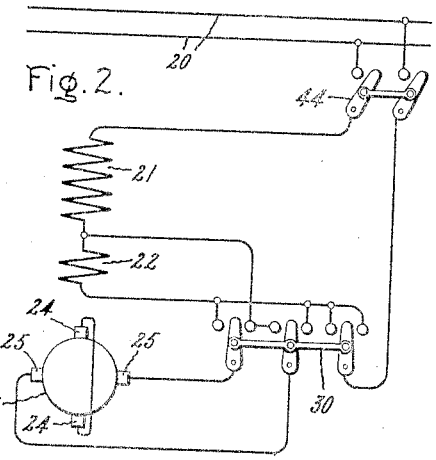
Figure 3:
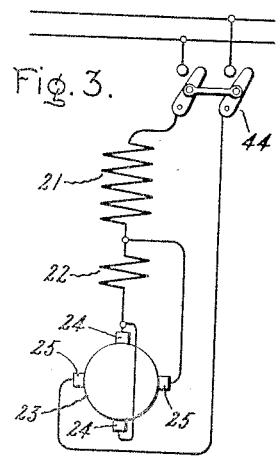
Figure 12:
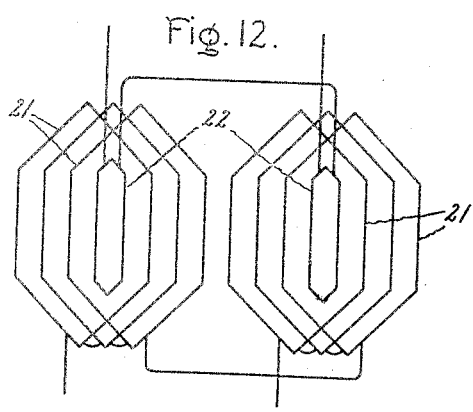

The improved motor of my present invention is a compound compensated single phase induction motor. The motor has three windings, an inducing winding, a compensating winding of relatively high reactance, and an induced or armature winding. The inducing and compensating windings have substantially the same axes of magnetization and are preferably located on the stator member of the motor, while the armature winding is a commutated winding of the ordinary direct current type and is preferably mounted on the rotor member of the motor. The torque-producing or exciting field of the motor is produced by a current flowing in the armature winding along an axis displaced substantially 90 electrical degrees from the axis of the inducing winding, and to this end the inducing winding and the armature winding, in whole or in part, are connected in series relation. The compensating winding is connected in shunt relation to the whole or a part of the armature winding, and has considerable reactance so that a sufficient part of the inducing winding current (line current) will flow through the armature winding along the exciting axis to provide a high motor torque, and in particular a high starting torque. The inducing winding current which flows through the armature winding along the exciting axis develops a torque-producing field having series characteristics, while the electromotive force of the compensating winding forces a current through the armature winding along the exciting axis which develops a torque-producing field having shunt characteristics. The resultant torque-producing field of the motor thus has compound characteristics, and the relative amounts of the series and shunt components of this resultant field can be controlled, in the first instance, by the design of the compensating winding, and, further, by employing relatively different amounts of the armature winding for carrying the series and shunt exciting currents. The construction and operation of the improved motor of my present invention, as well as the many modifications of the connections thereof, will be better understood from the following description taken in connection with the accompanying drawings, in which:

Figures 1 and 3 diagrammatically represent the improved motor of my present invention with the windings connected to produce relatively different motor characteristics; Figs. 2, and 4 to 11, inclusive, diagrammatically represent modified connections of the motor windings to suitable reversing switches for obtaining different motor characteristics; and Fig. 12 is a diagrammatic view showing one way in which the inducing and compensating windings of my improved motor may be arranged.

The motor diagrammatically represented in Fig. 1 of the drawings is a single phase alternating current commutator motor of the induction motor type having compound excitation, or in other words having series excitation and shunt excitation. As previously stated I prefer to call this motor a compound compensated single phase induction motor, although it may be called a repulsion-induction motor, since it possesses certain of the characteristic features of the repulsion and induction motors. In this figure a switch 44 is diagrammatically shown for connecting the motor to a single phase alternating current source of energy 20. The motor has a main field or inducing winding 21 and an auxiliary field or compensating winding 22 both arranged on the stationary member or stator of the motor. It will of course be understood that the two windings 21 and 22 may be mechanically arranged on the stator as a single winding and that the compensating winding 22 may consist of a few coils of this winding. The inducing and compensating windings are so arranged that their magnetic axes are substantially coincident. The rotor of the motor carries a commutated induced or armature winding of the direct current type, diagrammatically represented by the circle 23. Two sets of brushes bear on the commutator of the armature winding. One set 24—24 of these commutator brushes are connected together and form a local short-circuit for the armature winding along an axis substantially coincident with the magnetizing axes of the stator windings 21 and 22. The other set 25—25 of the commutator brushes are displaced 90 electrical degrees from the brushes 24—24. The brushes 24—24 are usually called the working or energy brushes, since they serve to provide a path through the armature winding for the working or energy current of the motor. This working or energy current is induced in the armature winding by transformer action with the main inducing winding 21 serving as the primary transformer winding. The brushes 25—25 are usually called the exciting or compensating brushes, since they serve to provide a path through the armature winding for the exciting current of the motor, that is to say for the current which develops the exciting or torque-producing field of the motor, also since this exciting current flowing between the armature brushes 25—25 acts to compensate or improve the power factor of the motor. An alternating current commutator motor having rotor excitation, that is to say having its exciting field produced by a current flowing in the rotor or armature winding, can be designed so as to operate at substantially unity power factor, because the armature winding in which the exciting current flows has practically no reactance, and therefore the magnetizing current of the motor is relatively small. The fact that the excitation is produced by a current flowing in the armature winding makes the motor in effect compensated, and the degree of compensation can be adjusted by varying the strength of the excitation produced by the armature current flowing between the brushes 25—25.

The exciting brushes 25—25 of the motor shown in Fig. 1 are connected across the compensating winding 22, so that the armature winding between the brushes 25—25 is in parallel with the compensating winding, and these two parallel-connected windings are connected across the mains 20 in series relation with the inducing winding 21. The line current, that is to say the current flowing through the inducing winding 21, thus passes in part through the armature winding between the brushes 25—25, and the other part passes through the compensating winding 22. The relative amount of the line current which passes through the armature winding and which produces the exciting field of the motor is thus influenced by the impedance of the compensating winding, and the greater the impedance of the compensating winding the greater will be the relative amount of line current flowing in the exciting circuit of the armature winding between the brushes 25—25. If the impedance of the compensating winding is small a relatively small amount of the line current passes through the armature winding so that the exciting field of the motor is relatively weak. At full speed the reactance of the armature circuit between the brushes 25—25 is very low, being substantially zero in the neighborhood of synchronism, and the current flowing in this armature circuit is determined merely by the ohmic resistance and the applied voltage. Therefore, in the neighborhood of synchronism, the reactance of the compensating winding will always be large as compared with the reactance of the armature circuit between the brushes 25—25. At standstill the reactance of the armature circuit between the brushes 25—25 is high, and in order to prevent the compensating winding from taking too much current, thereby throttling away the exciting field of the motor, I give the compensating winding enough reactance to divert a sufficient part of the line or inducing winding current to the exciting circuit of the armature winding to develop at standstill a strong torque-producing series field, whereby the motor has a relatively high starting torque. In other words, the compensating winding is designed with a relatively high reactance in order that the exciting field of the motor may be of sufficient strength to produce the desired motor torque, particularly at starting. To this end I prefer to wind the compensating winding with an extremely narrow coil-pitch as compared with the pole arc of the inducing winding, for example a coil-pitch embracing only one or two teeth, whereby the percentage leakage reactance drop is relatively high. Practically, the leakage reactance of such a coil depends principally upon the slot part, and the end-connections of the coil contribute no more than 10 per cent. of the whole leakage reactance. Hence, it is clear that the wider the span of the coil, with respect to the pole arc of the inducing winding which makes it possible to have a larger flux and larger voltage per turn, the smaller will be the leakage reactance per induced voltage. In Fig. 12 of the drawings, I have diagrammatically illustrated two poles of the inducing and compensating windings arranged as just described in order to give the compensating winding a relatively high reactance. It will be observed from this figure that the pitch of the coils of the compensating winding 22 is much smaller than the pitch of the coils of the inducing winding 21, and that the compensating winding coils embrace only a small part of the pole arc of the inducing winding.

The compensating winding 22, accordingly, has considerable reactance, and is so designed that an electromotive force of suitable magnitude and phase is impressed on the commutator brushes 25—25 for producing the desired shunt excitation of the motor. Such a shunt excitation limits the no-load speed of the motor in the well understood manner. Since the commutator brushes 25—25 are connected in series relation with the inducing winding 21, a portion of the line current flows through the armature winding which gives the motor a series excitation. The relative amounts of the shunt and series excitations can be controlled by the design of the compensating winding, as will be clearly understood by those skilled in the art from the foregoing explanation, and in addition the relative amounts of the shunt and series excitations in a standard motor can be altered by changing the motor connections as hereinafter explained.

Those skilled in the art will readily understand that the armature current flowing between the brushes 25—25 sets up the exciting or torque-producing field of the motor, while the armature current flowing between the brushes 24—24 and induced in the armature winding by the inducing winding 21 is the working or energy current of the motor which reacts with the exciting field to produce the motor torque. The starting torque of the motor represented in Fig. 1 depends, first, on the ratio of the active ampere turns of the armature winding between the brushes 25—25 and the ampere turns of the inducing winding 21, second, on the resistance and reactance of the motor circuits, and third, on the ratio of the resistance and reactance of the armature winding between the brushes 25—25 and the resistance and reactance of the compensating winding 22. The latter ratio should preferably be chosen in such a way that the current flowing between the commutator brushes 25—25, which produces the exciting field of the motor, has the same time phase as the armature current flowing between the commutator brushes 24—24. By properly designing the motor it is possible to obtain 250 per cent. starting torque with 300 per cent. current. The motor has a limited no-load speed due to the shunt excitation derived from the compensating winding. If the line current decreases, due to the absence of load, and the exciting field of the motor is weakened, the voltage induced in the compensating winding 22 will drive through the armature winding between the brushes 25—25 a field current which limits the speed of the motor. It will be understood by those skilled in the art that the power factor of the motor can be brought to unity by properly proportioning the compensating winding 22.

The direction of rotation of the motor of Fig. 1 can be reversed by shifting the exciting brushes 25—25 180 electrical degrees, and the motor will have the same operating characteristics in either direction of rotation. Reversible alternating current motors are employed in cases where the direction of rotation of the motor is very frequently changed, as for example in hoists, elevators, particularly freight and slow speed elevators, in cranes for driving the carriages, and in operating switches and valves. It will be evident that brush-shifting through an angle of 180 electrical degrees would be objectionable on a motor whose direction of rotation is to be so frequently reversed, so that practically it is not desirable to use such a method of reversing the motor. The necessary changes in the connections of the windings of the improved motor of my present invention can, however, be effected by a single double-throw switch, and the motor is for this reason particularly adapted for reversible duty. In Fig. 2 of the drawings I have shown a reversing switch 30 applied to the motor of Fig. 1. The switch 30 is a three-pole double-throw switch with a central "off" position. When the switch 30 is thrown to its right-hand position the motor windings are connected just as illustrated in Fig. 1. To reverse the direction of rotation of the motor, the switch 30 is thrown to its left-hand position, whereupon the relative direction of current flow through the armature winding between the exciting brushes 25—25 is reversed, and simultaneously the connections of the compensating winding 22 to the brushes 25—25 are reversed, thus the relative directions of the exciting field and of the compensation of the motor are reversed, which reverses the direction of rotation of the motor, as will be well understood by those skilled in the art.

Figure 4:
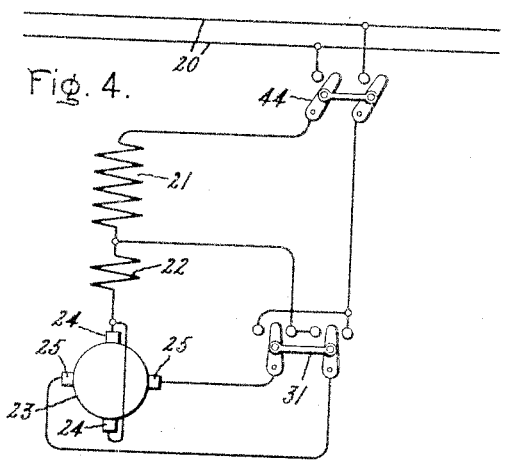

In Fig. 3 I have shown a motor of the same type shown in Fig. 1, but having only one-half of the armature winding connected to the compensating winding 22. Thus the compensating winding 22 is connected between one brush 25 and the short-circuited working brushes 24—24. The motor diagrammatically represented in Fig. 3 thus has only about one-half of the shunt excitation that the motor represented in Fig. 1 has, and hence the series excitation is relatively stronger and the motor may have a relatively higher starting torque than does the motor of Fig. 1. Furthermore, since the compensating winding is connected across only a half of the armature winding, the relative value of its reactance will be increased, and less current will flow therethrough, so that more current will flow through the armature winding between the brushes 25—25, and the exciting field of the motor will be correspondingly increased. If the reactance of the compensating winding circuit is zero, the no-load speed of the motor will be substantially its synchronous speed, and the no-load speed will increase as the reactance of the compensating winding is increased, hence the increase in the relative reactance of the compensating winding resulting from the connection of this winding across only a half of the armature winding gives the motor a higher no-load speed. The motor of Fig. 3 is adapted to be reversed by a two-pole double-throw switch 31, connected to the motor windings as illustrated in Fig. 4. An examination of Fig. 4 will show that the switch 31 when moved from one running position to the other reverses the exciting field and the compensation of the motor, and hence the direction of rotation of the motor. It will be observed that the reversing connections for the motor in Fig. 4 are simpler than in Fig. 2, and a two-pole reversing switch can be used with the motor in the former figure, whereas a three-pole reversing switch must be used with the motor in the latter figure.

Figure 5:
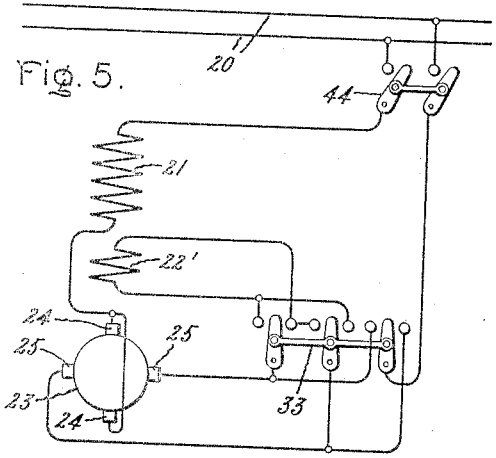

The inducing and compensating windings 21 and 22 of the motor represented in Fig. 5 are electrically independent, but are inductively related to one another, just as in the motors of the preceding figures. The motor connections represented in this figure are such that the whole of the armature winding is used for the shunt excitation and only one-half of the armature winding is used for the series excitation. The motor represented by this figure, accordingly, has more predominating shunt characteristics than the motors represented by Figs. 1 and 3, and also has a lower no-load speed, since the reactance of the compensating winding is relatively smaller. A three-pole double-throw reversing switch 33 is connected to the windings of the motor to reverse the compensation and exciting field.

Figure 6:
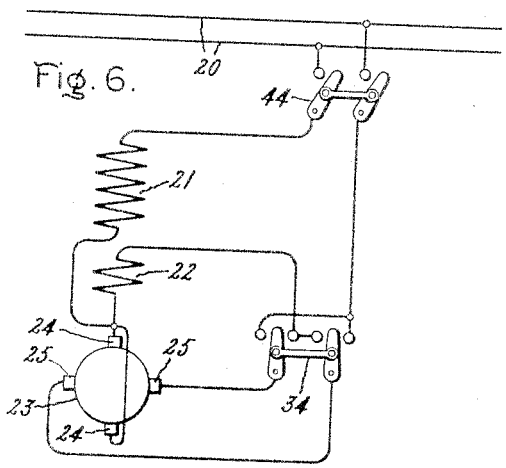

In the motor represented in Fig. 6 one-half of the armature winding is used for both shunt and series excitation, and in this case a two-pole double-throw switch 34 will effect the reversal of the motor.

Figure 11:
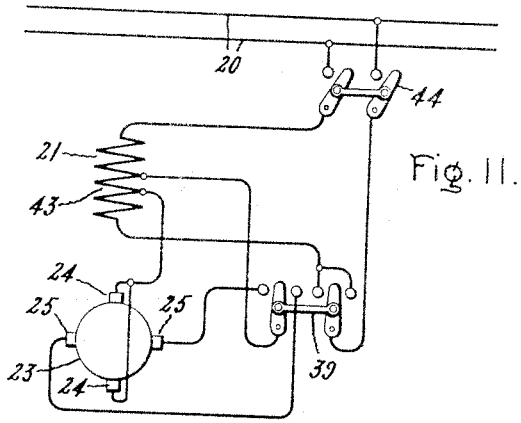

The exciting current flowing in the armature winding may be obtained from certain coils of the main inducing winding, as for example, from coils located in the center of the inducing winding. Fig. 11 represents a motor in which the exciting circuit of the armature winding is connected by means of a double-throw reversing switch 39 to coils 43 located at the center of the inducing winding. The coils 43 correspond electrically to the compensating winding 22, and have relatively considerable reactance, and are connected in shunt with the exciting circuit of the armature winding, so that the line current divides between these parallel-connected circuits just as in the motors hereinbefore described. The excitation of the motor of Fig. 11 depends upon the electromotive force of the coils 43, as well as upon the line current, and is, accordingly, compound just as in the motors hereinbefore described. It will be observed that in the motor of Fig. 11 only one-half of the armature winding along the axis of the brushes 25—25 is used for excitation.

Figure 7:
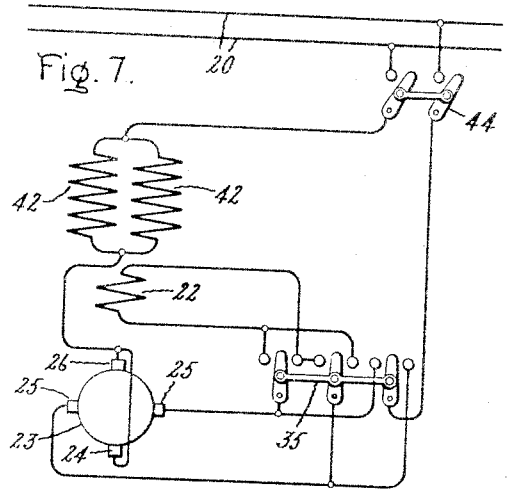
Figure 8:
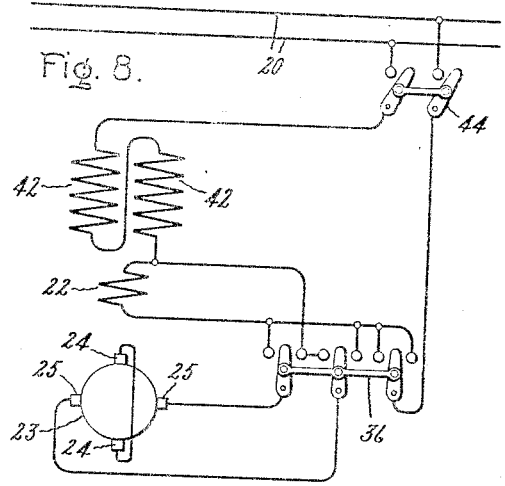

It is often desirable for manufacturers and jobbers to carry in stock a standard motor which can be used on commercial circuits of two different voltages. For example, 110 volts and 220 volts are common voltages for commercial electric circuits, and it is very advantageous to have a single design of motor which may be used on either circuit. To this end I have provided the two-circuit or double voltage motors diagrammatically illustrated in Figs. 7 to 10 inclusive. In the motors shown in these figures the inducing winding consists of two circuits 42—42, which are connected in series for the higher voltage, for example 220 volts, and in multiple or parallel for the lower voltage, for example 110 volts. Furthermore, the whole armature winding is used for the series excitation for the higher voltage, while only one-half of the armature winding is used for the series excitation for the lower voltage. Fig. 7 shows a two-circuit alternating current commutator motor, of the same type as shown in Fig. 1, connected to a single phase source of electric energy 20, of say 110 volts. The two circuits 42 of the inducing winding are in parallel and only one-half of the armature winding is used for the series excitation, while the whole armature winding is used for the shunt excitation. A three-pole double-throw switch 35 is connected to the motor windings and operates to reverse the direction of rotation of the motor, as will be well understood from the foregoing explanation. Fig. 8 shows the same motor as shown in Fig. 7 connected to a single phase source of electric energy 20 of higher voltage, for example 220 volts. The two circuits 42 of the inducing winding are in the motor of this figure connected in series and the whole armature winding is used for the series excitation, as well as for the shunt excitation. A three-pole double-throw switch 36 is connected to the windings of the motor for reversing.

Figure 9:
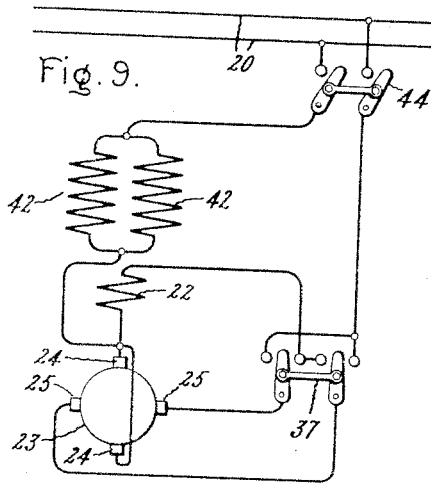
Figure 10:
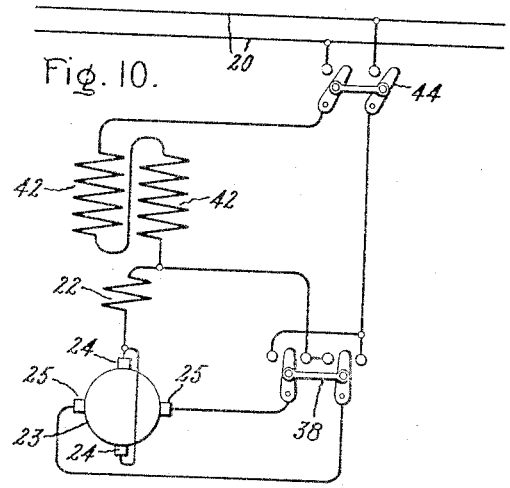

The motors represented in Figs. 9 and 10 are similar to those shown in Figs. 7 and 8, respectively, the only difference being that in the motors of the latter figures the whole armature winding is used for the shunt compensation, whereas in the motors of Figs. 9 and 10 only one-half of the armature winding is used for the shunt excitation. Consequently, the reactance of the compensating winding is relatively higher in the motors of Figs. 9 and 10 than in the motors of Figs. 7 and 8, respectively, whereby the motors of Figs. 9 and 10 have relatively higher starting torques, since a larger current for exciting the series field flows through the armature winding between the brushes 25—25. Furthermore, the no-load speeds of the motors of Figs. 9 and 10 are relatively higher than of the motors of Figs. 7 and 8, respectively, due again to the higher relative value of the reactance of the compensating winding. Two-pole double-throw reversing switches 37 and 38 are connected to the windings of the motors of Figs. 9 and 10, respectively.

In each of the motors diagrammatically represented in the figures of the accompany drawings, the exciting or torque-producing field is produced by the current flowing in the armature or induced winding along an axis displaced by 90 electrical degrees from the axis of the inducing winding. These motors thus have rotor excitation, and since the armature winding in which the exciting current flows has relatively low inductance, the power factor of the motors is inherently high. By properly proportioning the strength of the exciting flux the power factor can be brought to unity. In the case of each motor the direction of rotation is determined by the relative directions of the torque-producing field and the current flowing in the inducing winding. The direction of rotation is changed by reversing the direction of the torque-producing field with respect to the direction of the inducing winding current. A particular direction of the torque-producing field is thus effective to produce rotation in a certain direction, and rotation in the other direction is obtained by reversing the effective direction of the torque-producing field. As previously explained the torque-producing field of each motor is produced by both series and shunt excitation, and in reversing the motor the effective direction of both the series and shunt excitations of the torque producing field is reversed. The reversal of the effective direction of the torque-producing field is obtained by a single double-throw switch. It will be observed that no reversing winding is employed, as has heretofore been the general practice in reversible motors of the repulsion induction motor type having shunt characteristics, and that the improved motor of my present invention may be easily converted into a reversible motor by properly connecting the terminals of the motor windings to a suitable double-throw reversing switch.

Double-throw reversing switches have been shown in the drawings merely for the purpose of explanation, and it will of course be understood by those skilled in the art that any suitable type of controller for effecting the necessary changes in the connections of the motor windings for reversal may be used. The double-throw switches, or any equivalent controller, are primarily intended for reversing duties, and while such circuit-controlling apparatus may have an "off" position which serves to disconnect the motor from the line, it is generally advisable to provide in addition an independent two-pole switch 44 for connecting the motor to the line.

I have explained my invention by diagrammatically illustrating and describing certain specific embodiments thereof, but it will be readily understood by those skilled in the art that the invention may be embodied in many other forms. I, accordingly, do not wish to be restricted to the particular construction and arrangements disclosed herein by way of example for the purpose of setting forth my invention in accordance with the patent statutes, but aim in the appended claims to cover all changes and modifications within the spirit and scope of the invention.

What I claim as new and desire to secure by Letters Patent of the United States, is:—

1. A single phase alternating current motor comprising an inducing winding and a compensating winding having substantially the same axes of magnetization, a commutated armature winding, means for short-circuiting said armature winding along an axis substantially coinciding with the axis of said inducing winding, means for electrically connecting said inducing winding in series relation with said armature winding so that the inducing winding current which flows in the armature winding produces a magnetic field whose magnetizing axis is displaced substantially 90 electrical degrees from the magnetizing axis of the inducing winding, and means for electrically connecting said compensating winding in shunt relation with said armature winding along an axis displaced substantially 90 electrical degrees from the axis of the inducing winding, said compensating winding having relatively high reactance whereby a sufficient part of the inducing winding current is diverted to the exciting circuit of the armature winding at standstill to produce a high starting torque.

2. A single phase alternating current motor comprising an inducing winding, a compensating winding having a relatively narrow coil-pitch whereby the winding has relatively high reactance, said inducing and compensating windings having substantially the same axes of magnetization, a commutated armature winding short-circuited along an axis substantially coinciding with the axis of said inducing winding, means for electrically connecting said inducing winding in series relation with said armature winding so that the inducing winding current which flows in the armature winding produces a magnetic field whose magnetizing axis is displaced substantially 90 electrical degrees from the magnetizing axis of the inducing winding, and means for electrically connecting said compensating winding in shunt relation with said armature winding along an axis displaced substantially 90 electrical degrees from the axis of the inducing winding.

3. A single phase alternating current motor comprising an inducing winding and a compensating winding having substantially the same axis of magnetization, a commutated armature winding short-circuited along an axis substantially coinciding with the axis of said inducing winding, means for electrically connecting said inducing winding to said armature winding so that a current is caused to flow in the armature winding which sets up a torque-producing series field for the motor, and means for electrically connecting said compensating winding to said armature winding so that a current is caused to flow in the armature winding which sets up a torque-producing shunt field for the motor, said compensating winding having relatively high reactance whereby a sufficient part of the inducing winding current is diverted to the exciting circuit of the armature winding at standstill to produce a high starting torque.

4. A single phase alternating current motor comprising an inducing winding, a compensating winding of relatively narrow coil pitch whereby the winding has relatively high reactance, said inducing and compensating winding having substantially the same axes of magnetization, a commutated armature winding, a plurality of commutator brushes, means coöperating with certain of said commutator brushes for short-circuiting the armature winding along an axis substantially coinciding with the axis of said inducing winding, means coöperating with certain of said commutator brushes for electrically connecting said inducing winding to said armature winding so that the inducing winding current which flows in the armature winding sets up a torque-producing series field, and means coöperating with certain of said commutator brushes for electrically connecting said compensating winding to said armature winding so that the electromotive force of the compensating winding causes a current to flow in the armature winding which sets up a torque-producing shunt field.

In witness whereof, I have hereunto set my hand this 27th day of December, 1915.

WILLEM C. KORTHALS-ALTES.